(12) United States Patent
Origoni et al.

(10) Patent No.: US 12,008,207 B1
(45) Date of Patent: Jun. 11, 2024

(54) REPRESENTING LOADING OF A PAGE OF A USER INTERFACE

(71) Applicant: Salesforce, Inc., San Francisco, CA (US)

(72) Inventors: Marcelo Origoni, San Francisco, CA (US); Marcelo Eduardo Cominguez, San Francisco, CA (US); Agustin Alexander, San Francisco, CA (US); Sandra Untersander, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/104,143

(22) Filed: Jan. 31, 2023

(51) Int. Cl.
*G06F 3/0481* (2022.01)
*G06T 13/80* (2011.01)

(52) U.S. Cl.
CPC ............ *G06F 3/0481* (2013.01); *G06T 13/80* (2013.01)

(58) Field of Classification Search
CPC ........ G06T 13/80; G06F 3/0481; G06F 13/80
See application file for complete search history.

(56) References Cited

U.S. PATENT DOCUMENTS

| | | | |
|---|---|---|---|
| 2004/0189439 A1* | 9/2004 | Cansino | H04L 67/025 340/5.2 |
| 2006/0253850 A1* | 11/2006 | Bruno | H04L 43/00 714/E11.197 |
| 2007/0124666 A1* | 5/2007 | Sauve | G06F 16/957 707/E17.119 |
| 2008/0301555 A1* | 12/2008 | Vartiainen | G06F 16/9577 707/E17.112 |
| 2016/0371872 A1* | 12/2016 | Bao | G06F 3/0481 |
| 2017/0169599 A1* | 6/2017 | Liu | G06F 3/048 |
| 2018/0240156 A1* | 8/2018 | Shaw | G06Q 30/0276 |
| 2023/0064010 A1* | 3/2023 | Banerjee | G06F 16/957 |

\* cited by examiner

*Primary Examiner* — Mong-Shune Chung
(74) *Attorney, Agent, or Firm* — Sterne, Kessler, Goldstein & Fox P.L.L.C.

(57) ABSTRACT

A user device (e.g., a computing device, a smart device, a mobile device, a laptop, a tablet, a display device, etc.) may identify a duration of a loading time for a page (e.g., web page, application page, links and/or linked data, documentation, a screen, etc.) of a user interface, for example, based on a request to load the page. The user device may retrieve a structure of the page that indicates an arrangement of page elements of the page, for example, based on the duration of the loading time exceeding a time threshold. The user device may cause, for example, during the loading time, display of a preview page for the page. According to some aspects of this disclosure, the preview page may include an animated representation of the structure of the page that indicates various arrangements of the page elements.

17 Claims, 7 Drawing Sheets

REPRESENTING LOADING OF A PAGE OF A USER INTERFACE

BACKGROUND

Webpages, user interface (UI) pages, and/or the like may be displayed, visited, accessed, requested, and/or navigated to a user device and are used to view content, documentation, and/or information. An amount of time necessary for the user device to load and/or render the webpages, UI pages, and/or the like is affected by the amount of data/information to be transferred to the user device, the network used to communicate a request for the webpages, UI pages, and/or the like, processing time required by a content source to provide content, loading/rendering capability of the user device, and/or the like. When there is an excessive amount of time required to load and/or render the webpages, UI pages, and/or the like, users become frustrated and/or may choose to terminate the loading/rendering. Tools such as progress bars, spinners, skeletons, and/or the like are used to show activity to a user, but the activity fails to convey progress (e.g., a sense of what is happening, etc.) for a loading/rendering event. This lack of progress knowledge negatively affects the usability of the user device, webpages, user interface (UI) pages, and/or the like for the end-user.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Provided herein are system, apparatus, device, method, computer program product embodiments, and/or combinations and sub-combinations thereof, for representing loading of a page of a user interface. A user device (e.g., a computing device, a smart device, a mobile device, a laptop, a tablet, a display device, etc.) may identify a duration of a loading time for a page (e.g., web page, application page, links and/or linked data, documentation, a screen, etc.) of a user interface, for example, based on a request to load the page. The user device may retrieve a structure of the page that indicates an arrangement of page elements of the page, for example, based on the duration of the loading time exceeding a time threshold. The user device may cause, for example, during the loading time, display of a preview page for the page. According to some aspects of this disclosure, the preview page may include an animated representation of the structure of the page that indicates various arrangements of the page elements.

In other words, according to some aspects of this disclosure, a preview page may be generated to provide a preview of how a page of a user interface will appear to a user once loaded (e.g., is available for display, access, interaction, etc.). The preview may be animated and/or dynamic to display activity and convey loading progress to a user—thus improving the usability of a user interface page access system. The system, apparatus, device, method, computer program product embodiments, and/or combinations and sub-combinations thereof, for representing the loading of a page of a user interface may use information (e.g., metadata, etc.) indicative of page loading events (e.g., previous loading, etc.) to forecast when a current load time for a page may meet and/or exceed a load time threshold and intelligently decide when to generate and/or provide a preview page for a user interface page and improve perceived page-responsiveness. These and other technological advantages are described herein.

Figure 1:
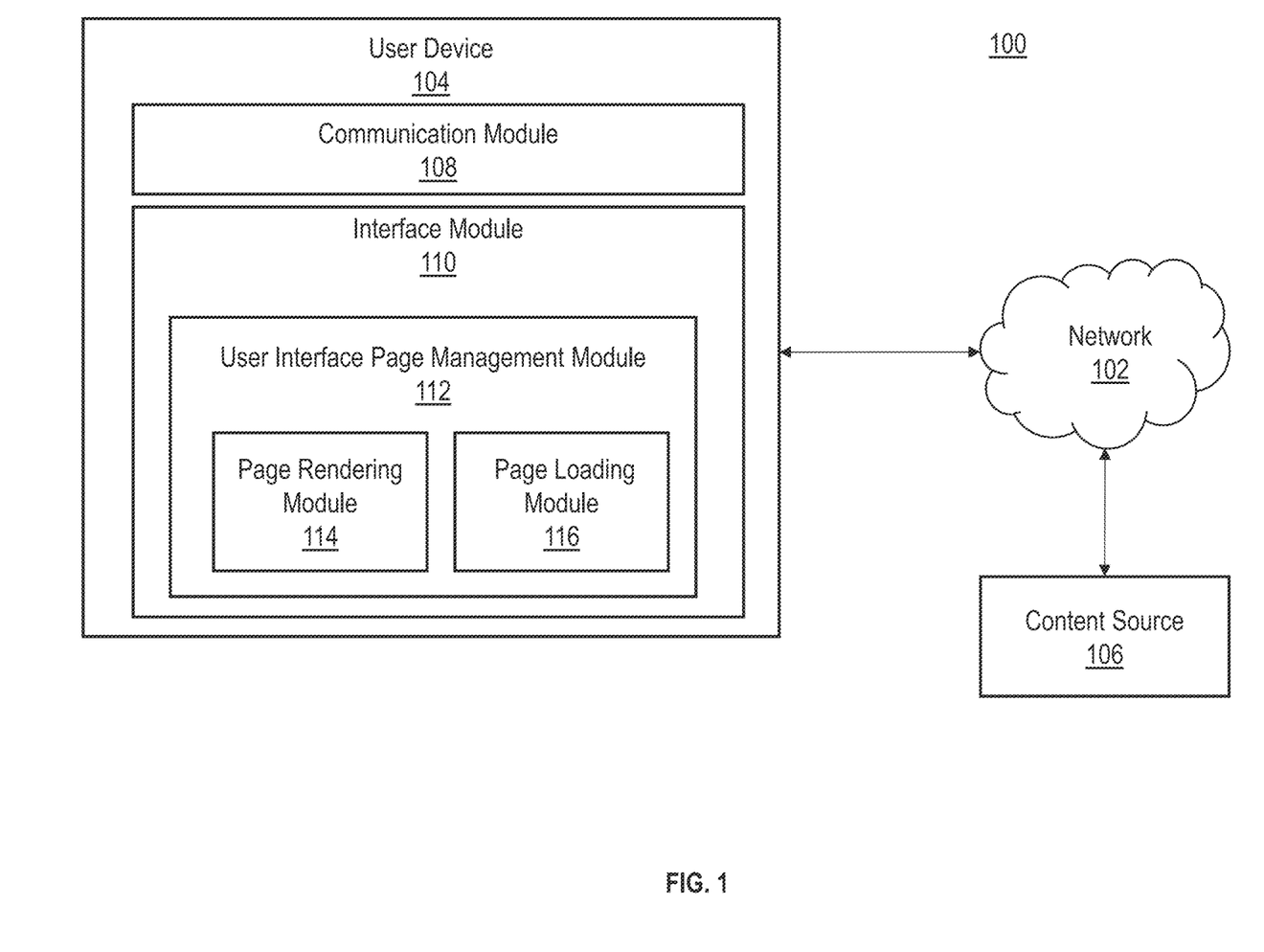
FIG. 1 shows an example system for representing loading of a page of a user interface, according to some aspects.

FIG. 1 shows an example system 100 for representing loading of a page of a user interface. According to some aspects of this disclosure, loading of a page may include, but is not limited to, presenting/displaying a user interface page, a file download, a data transfer, and/or the like. According to some aspects of this disclosure, system 100 is merely an example of one suitable system environment and is not intended to suggest any limitation as to the scope of use or functionality of aspects described herein. Neither should the system 100 be interpreted as having any dependency or requirement related to any single module/component or combination of modules/components described therein.

According to some aspects of this disclosure, system 100 may include a network 102. According to some aspects of this disclosure, network 102 may include a packet-switched network (e.g., internet protocol-based network), a non-packet-switched network (e.g., quadrature amplitude modulation-based network), and/or the like. According to some aspects of this disclosure, network 102 may include network adapters, switches, routers, modems, and the like connected through wireless links (e.g., radiofrequency, satellite) and/or physical links (e.g., fiber optic cable, coaxial cable, Ethernet cable, or a combination thereof). According to some aspects of this disclosure, network 102 may include public networks, private networks, wide area networks (e.g., Internet), local area networks, and/or the like. According to some aspects of this disclosure, network may include a content access network, content distribution network, and/or the like. According to some aspects of this disclosure, network 102 may provide and/or support communication from telephone, cellular, modem, and/or other electronic devices to and throughout system 100. For example, system 200 may include a user device 104 in communication with a content source 106 via network 102.

According to some aspects of this disclosure, the user device 104 may include a computing device, a smart device, a mobile device, a laptop, a tablet, a display device, or any other device capable of communicating with the content source 106. The user device 104 may include a communication module 108 that facilitates and/or enables communication with the content source 106 and/or any other device/component of the system 100. For example, the communication module 108 may include hardware and/or software to facilitate communication. The communication module 108 may comprise one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. The communication module 108 may include any hardware and/or software necessary to facilitate communication.

According to some aspects of this disclosure, user device 104 may include an interface module 110. According to some aspects of this disclosure, interface module 110 enables a user to interact with user device 104, content source 106, and/or the like. The interface module 110 may include any interface for presenting and/or receiving information to/from a user.

According to some aspects of this disclosure, content source 106 may include a content server, a computing device, a web server, an application server, and/or the like. According to some aspects of this disclosure, content source 106 may provide content (e.g., data/information, video, audio, games, applications, resources, etc.) to a user. According to some aspects of this disclosure, content source 106 may be managed by content providers, service providers, online content providers, over-the-top content providers, and/or the like. The content may be provided via a public domain, a subscription, individual item purchase or rental, and/or the like. According to some aspects of this disclosure, content source 106 may support any applications, and/or functions including, but not limited to, applications and/or functions enabled and/or supported by, but not limited to, Hypertext Transfer Protocol (HTTP) HTTP servers, File Transfer Protocol (FTP) servers, Common Gateway Interface (CGI) servers, data servers, Java servers, business/entity application servers, and/or the like. According to some aspects of this disclosure, content source 106 may execute programs and/or scripts in response to requests from user device 104, such as by executing one or more Web applications that can be implemented as one or more scripts or programs written in any programming and/or scripting language including, but not limited to, Java®, C, C#, C++, Perl, Python, TCL, combinations thereof, and/or the like. Although shown as a single device, according to some aspects of this disclosure, content source 106 may include a plurality of computing devices (e.g., servers, network devices, etc.), support/include an integrated system for providing content, and/or the like.

According to some aspects of this disclosure, content from and/or supported by content source 106 may be accessed by a content browser, for example, such as a user interface page management module 112 of the interface module 110, and/or the like. According to some aspects of this disclosure, content provided by content source 106 may be accessed, viewed, displayed, and/or the like via one or more pages generated, accessible, interfaced, and/or the like by user device 104 (e.g., interface module 110, etc.).

According to some aspects of this disclosure, interface module 110 may include the user interface page management module 112. According to some aspects of this disclosure, user interface page management module 112 enables a user to view web application documentation and/or content, application pages, webpages, and/or any other page of a multipage user interface. For example, user interface page management module 112 may be used to access and/or view pages and/or the like of an application configured with, and/or accessible by the user device 104. According to some aspects of this disclosure, user interface page management module 112 may be used to access and/or view pages and/or the like of a user interface (e.g., the interface module, a multipage user interface, etc.) generated by, configured with, and/or accessible by user device 104.

According to some aspects of this disclosure, user interface page management module 112 may include a web browser (e.g., Internet Explorer®, Mozilla Firefox®, Google Chrome®, Safari®, or the like). The user interface page management module 112 may request or query various files from a local source and/or a remote source, such as the content source 106, and/or the like. According to some aspects of this disclosure, user interface page management module 112 may access, process, and/or view information, pages, and applications available to it from system 100 via network 102.

According to some aspects of this disclosure, interface module 110 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects of this disclosure, interaction with the input devices, and/or components may enable a user to view, visit, access, request, and/or navigate to a page of a user interface generated and/or displayed by the interface module 110 and/or accessible via the user interface page management module 112.

According to some aspects of this disclosure, interface module 110 may include a page rendering module 114. According to some aspects of this disclosure, page rendering module 114 may generate, render, and/or cause to be displayed a page (e.g., web page, application page, links and/or linked data, documentation, a screen, etc.), for example, for a page of a user interface. According to some aspects of this disclosure, page rendering module 114 may use information indicating a structure of a page of a user interface to generate, render, and/or cause to be displayed the page. According to some aspects of this disclosure, a structure of a page may indicate an arrangement of page elements (e.g., data/information fields, data/information representations, logos, icons, analytical elements, interactive tools, data/information links/references, regions, images, content, paragraphs, etc.) of the page. For example, according to some aspects of this disclosure, page rendering module 114 may use document object models (DOMs), cascading style sheets object models (CSSOMs), hypertext markup language (HTML) elements, and/or the like to generate, render, and/or cause to be displayed a page of a user interface.

Figure 2A:
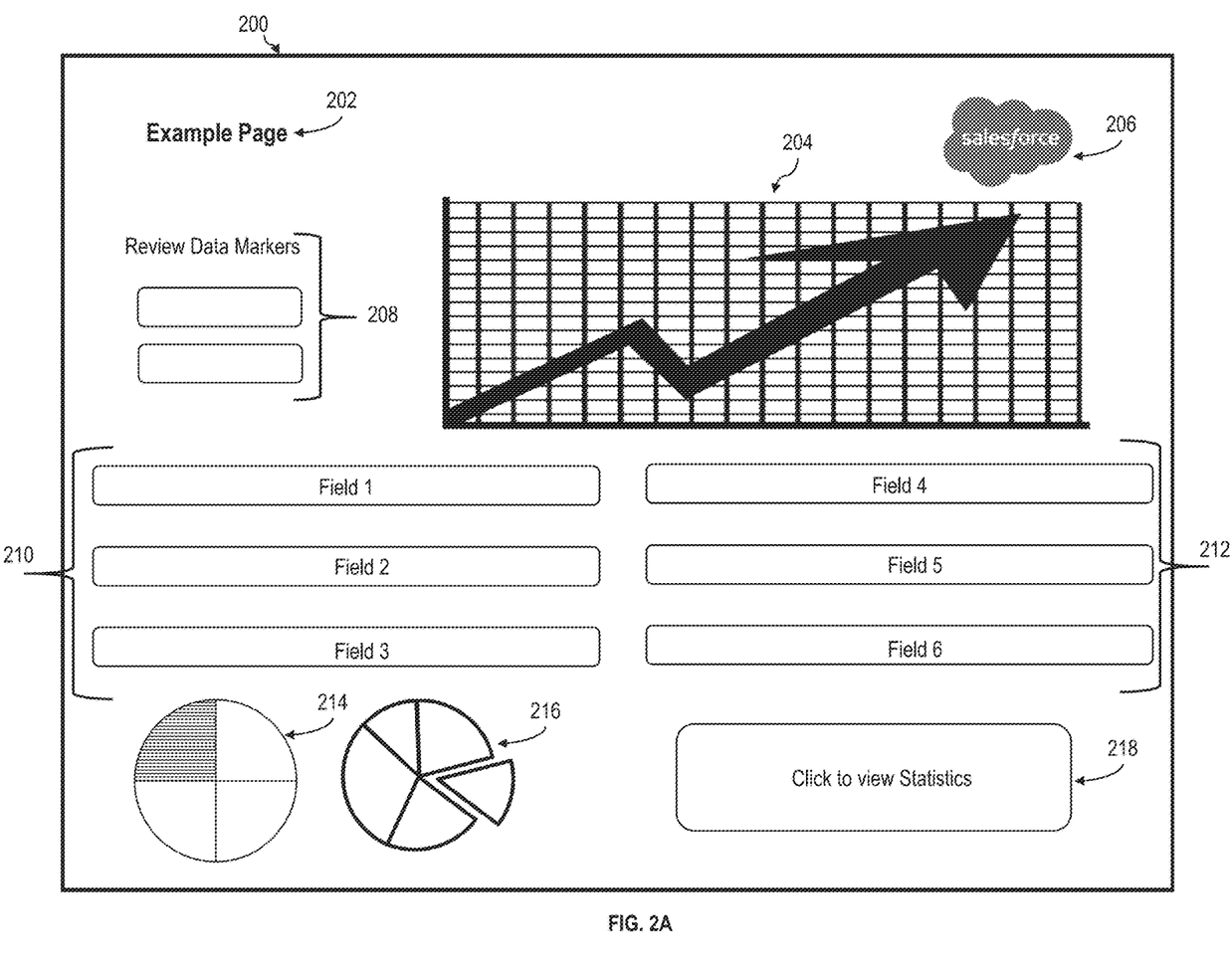
FIG. 2A shows an example page of a user interface, according to some aspects.

FIG. 2A shows an example of a page 200 of a user interface generated, accessed, and/or displayed by the interface module 110. The page 200 may include various page elements 202-218. As shown, page elements 202-218 may present information in various ways.

Returning to FIG. 1, according to some aspects of this disclosure, interface module 110 may include a page loading module 116. According to some aspects of this disclosure, page loading module 116 may generate, render, and/or cause to be displayed a preview page of a page of a user interface. According to some aspects of this disclosure, a preview page may provide a preview of how a page of a user interface will appear to a user once loaded (e.g., is available for display, access, interaction, etc.). According to some aspects of this disclosure, the preview may be animated and/or dynamic, for example, representations of page elements of a page may be manipulated, modified, and/or the like, to display activity and convey loading progress to a user.

According to some aspects of this disclosure, to generate, render, and/or cause to be displayed a preview page of a page of a user interface, page loading module 116 may store and/or record each instance where, for example, a page of the user interface is viewed, visited, accessed, requested, and/or navigated to by the user device 104. According to some aspects of this disclosure, page loading module 116 may capture a DOM for a page whenever the page is viewed, visited, accessed, requested, and/or navigated by the user device 104. According to some aspects, page loading module 116 may receive information indicative of a DOM for a page of a user interface from the content source 106, an entity-managed device (e.g., an entity-managed cloud-based server, etc.), a third-party source, and/or the like. According to some aspects of this disclosure, the DOM may be stored as a base64 image (e.g., using canvas element, JavaScript, etc.). According to some aspects of this disclosure, the DOM may be stored locally, via a storage module/component of user device 104 and/or the like. According to some aspects of this disclosure, the DOM may be stored remotely from the user device 104 and/or accessed/requested by the user device 104, for example, in response to a request to load a corresponding page of a user interface and/or the like.

According to some aspects, page loading module 116 may generate, render, and/or cause to be displayed a preview page for a page of a user interface by using a just-in-time compiled programming language such as JavaScript, Typescript, Dart, ClojureScript, Ruby, Python, and/or the like. For example, JavaScript with dynamic generation of a Document Object Model (DOM) and Cascading Style Sheets (CSS) may be used to generate, render, and/or cause the display of a preview page for a page of a user interface. According to some aspects, user device 104 may use and/or implement any programming language to generate, render, and/or cause the display of a preview page for a page of a user interface.

As previously described, according to some aspects, page loading module 116 may generate, render, and/or cause to be displayed a preview page of a page of a user interface based on data/information stored by user device 104, content source 106, an entity-managed device (e.g., an entity-managed cloud-based server, etc.), a third-party source, and/or the like. According to some aspects of this disclosure, EXAMPLE 1 below shows an example code for generating a preview page with animated and/or adaptable page elements.

function begins by creating an array called unfrozen which contains all elements with the class "bg" that have the attribute "data-frozen" equal to "0". If the unfrozen array is not empty, the movePieces( ) function is called and passed the unfrozen array. If the unfrozen array is empty, the unBlur( ) function is called. The unBlur( ) function is used to reduce the blur effect on an element with an id of "puzzle". According to some aspects of this disclosure, the unBlur( ) function does this by decreasing the "blur" value on the element's webkitfilter style property, until the blur is removed completely. The movePieces( ) function is passed an array of unfrozen elements. Inside the function, it creates two variables (x and y), then creates an array of all elements with the class "bg". According to some aspects of this disclosure, the movePieces( ) function then uses the getRandomNumbers( ) function to generate random indexes for the unfrozen array, and uses these indexes to select elements from the unfrozen array to move. According to some aspects of this disclosure, EXAMPLE 1 is an example of schema to be used to generate, render, and/or cause to be displayed a preview page of a page of a user interface and other schemas, coding, and/or the like may be used to generate, render, and/or cause to be displayed a preview page.

Figure 2B:
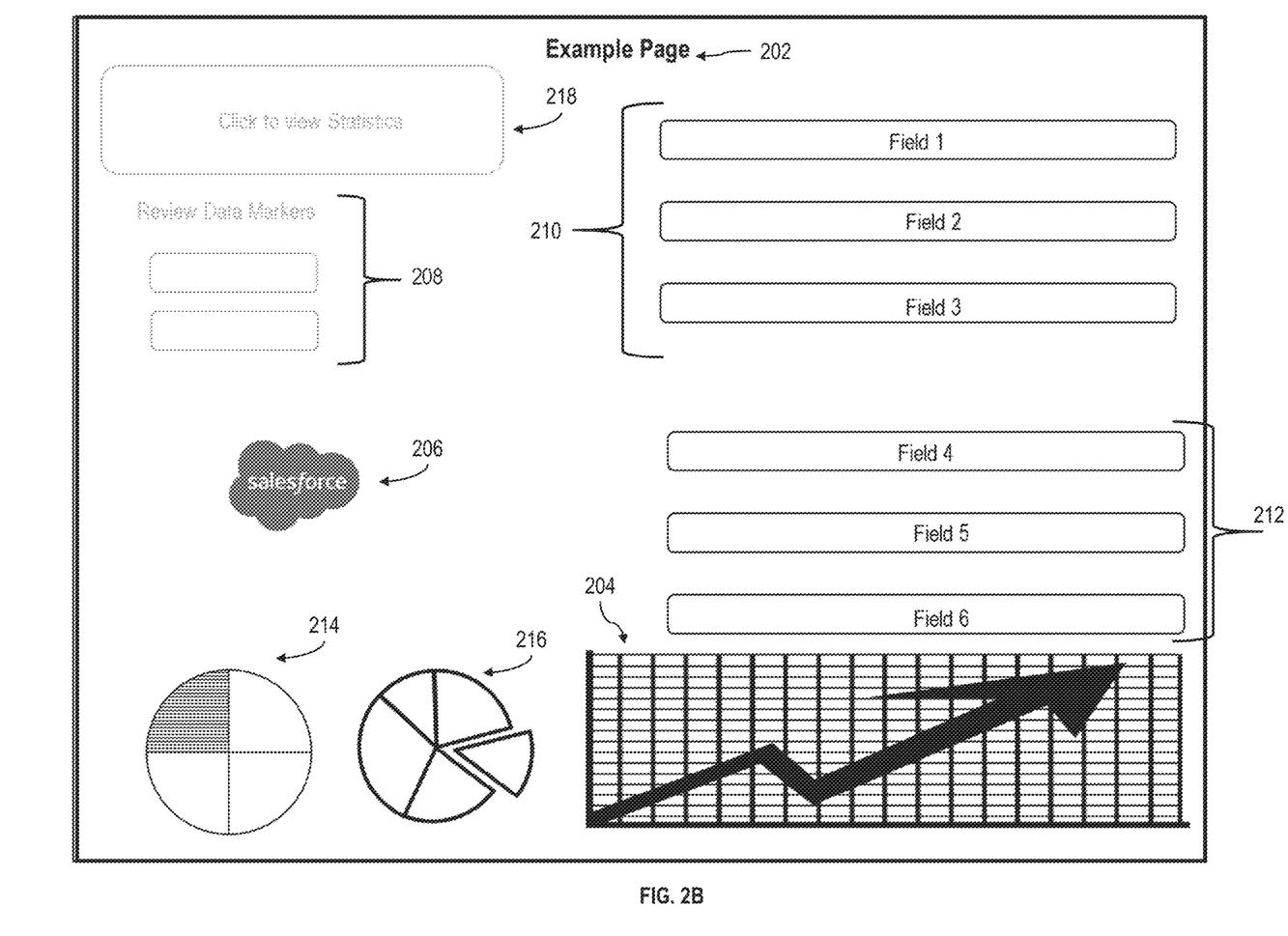
FIGS. 2B-2D show an example preview page for a page of a user interface, according to some aspects.
Figure 2C:
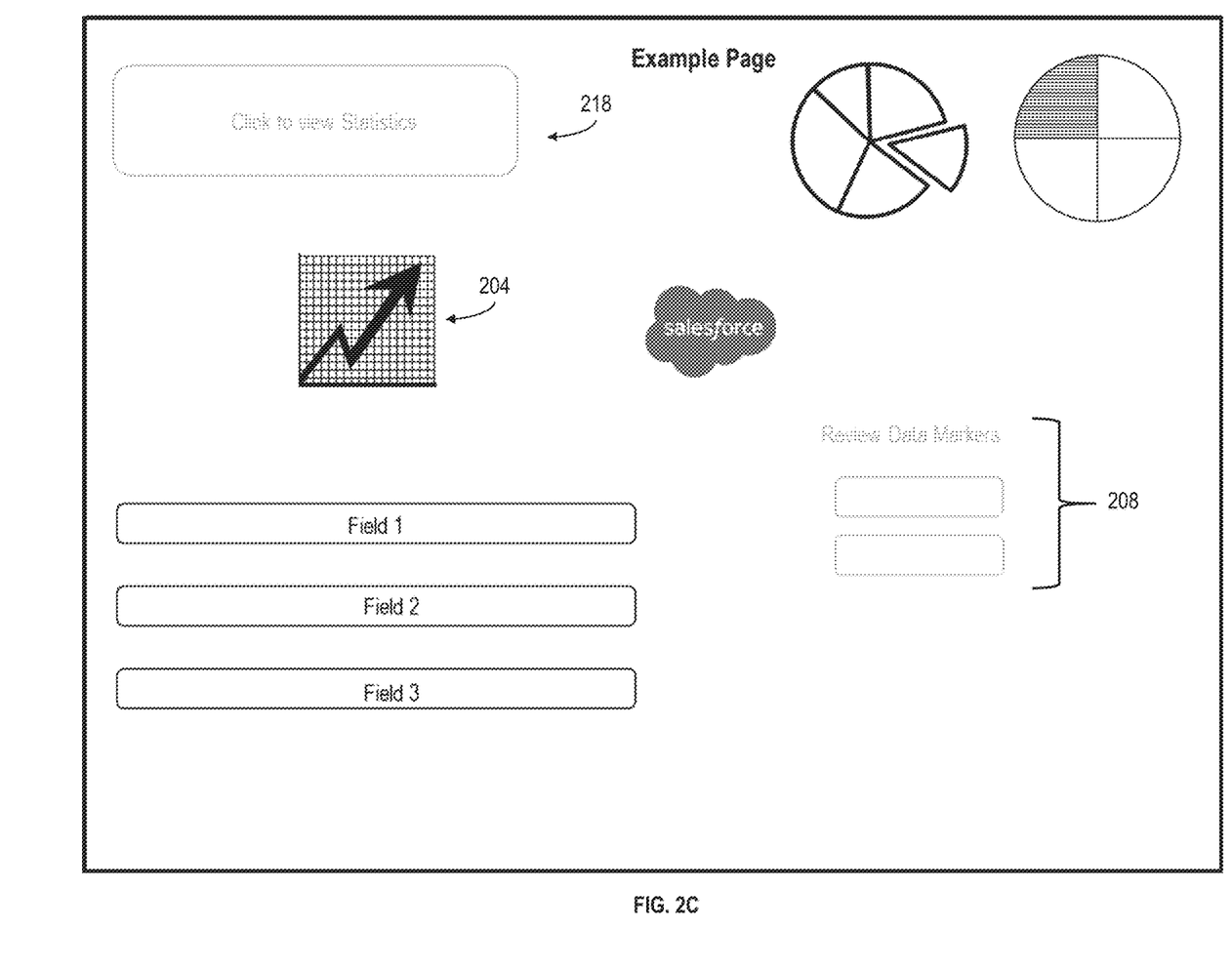

FIGS. 2B-2C show examples of an adaptable, dynamic, and/or animated preview page 220 of page 200 (FIG. 2A) of a user interface generated, rendered, and/or caused to display by page loading module 116. Preview page 220 includes varied representations of the structure of page 200. As shown, the arrangement of page elements 202-218 is varied during the generation, rendering, and/or display of the preview page 220.

According to some aspects of this disclosure, as shown in FIGS. 2B-2C, the representation of the structure of page 200 page may include a blurred and/or puzzle arrangement of page elements 202-218 that falls into place during a loading time and/or as page 200 is being loaded, rendered, prepared for display, and/or the like. According to some aspects of this disclosure, as shown in the representation of page elements

```
const solve = ( ) => {
    const unfrozen = Array.from(document.getElementsByClassName("bg") ) . filter( piece
    => piece.getAttribute("data-frozen") === "0");
    if(unfrozen.length > 0) {
        movePieces (unfrozen);
    }else {
        unblur( ) ;
    }
}
const unBlur = ( ) => {
    if(blur >= 0) {
        document.getElementById( 'puzzle' ).style.webkitfilter = 'blur (${blur}px)';
        blur = blur −1;
    }
}
const movePieces = (unfrozen) => {
    let x = 1;
    let y = 1;
    const pieces = Array.from(document.getElementsByClassName("bg") )
    const indexes = getRandomNumbers(unfrozen.length, Math.round(pieces.length / 10));
    indexs.map( index => {
        const piece = unfrozen[index];
```

Example 1

According to some aspects of this disclosure, EXAMPLE 1 defines three functions: solve( ), unBlur( ), and movePieces( ). According to some aspects of this disclosure, the solve( ) function may be used to perform the main logic functions. For example, in EXAMPLE 1, the solve( )

208 and 218 in FIG. 2B in comparison to the representation of page elements 208 and 218 in FIG. 2C, the blurred representations of page elements 208 and 218 may become smaller (e.g., page element 204, etc.) and/or less blurred until page 200 is ready to be displayed, rendered, viewed, etc. According to some aspects of this disclosure, as shown in the representation of page element 212, some page elements may be obscured, removed, and/or not displayed until page 200 is ready to be displayed, rendered, viewed, etc. According to some aspects of this disclosure, preview page 220 may include any animated and/or dynamic manipulation and/or representation of page elements 202-218.

Returning to FIG. 1, according to some aspects of this disclosure, page loading module 116 be include an analytical model, artificial intelligence, and/or a predictive model (e.g., a predictive model trained using supervised and/or unsupervised methods, along with labeled and/or unlabeled data to forecast loading times for user interface pages, etc.). According to some aspects of this disclosure, page loading module 116 may identify, determine, and/or predict when to generate, render, and/or cause to be displayed a preview page of a page of a user interface. According to some aspects of this disclosure, page loading module 116 may be, for example, based on a request to load a page of a user interface, identify a duration of a loading time for the page.

According to some aspects of this disclosure, page loading module 116 may determine and/or operate to generate, render, and/or cause to be displayed a preview page for the page, for example, based on the duration of the loading time exceeding a time threshold. The time threshold may be user-configured, forecasted/predicted by a predictive model, and/or determined by a device (e.g., cloud-based device, server, etc.) in communication with user device 104. According to some aspects of this disclosure, page loading module 116 may use information (e.g., metadata, etc.) indicative of page loading events (e.g., previous loading, etc.) to forecast when a current load time for a page may meet and/or exceed a load time threshold and intelligently decide when to generate and/or provide a preview page for a user interface page and improve perceived page-responsiveness.

According to some aspects of this disclosure, page loading module 116 may identify and/or determine a loading time for a page based on an identifier of the page. According to some aspects of this disclosure, page loading module 116 may access and/or retrieve a look-up table and/or the like that maps page identifiers to expected loading times for the corresponding.

According to some aspects of this disclosure, page loading module 116 may identify and/or determine an expected loading time for a page and adjust the expected loading time for the page based on network conditions and/or the like. For example, user device 104 may include a network sniffer, telemetry component, and/or network/device analysis component that periodically assesses network 102 and/or communication channels between user device 104 and content source 106 to determine if loading a page may be affected by errors, latency, failures, and/or the like. For example, if an expected loading time for a page is two seconds, and page loading module 116 identifies that communication between user device 104 and content source 106 is delayed and/or experiencing errors that cause communication latency of a second, then page loading module 116 may adjust the duration of the loading time of the page to be three seconds. Based on the three duration of the loading time of the page exceeding a time threshold of 2.3 seconds, page loading module 116 may cause a preview page to be displayed. According to some aspects of this disclosure, page loading module 116 may forecast and/or predict a loading time for a page that considers any identified errors, latency, failures, and/or the like that may affect an expected loading time. According to some aspects of this disclosure, page loading module 116 may adjust an expected loading time for a page based on any determined and/or identified errors, latency, failures, conditions, and/or the like.

According to some aspects of this disclosure, page loading module 116 may identify, determine, forecast, and/or calculate an amount of time remaining until a page loading is complete. For example, according to some aspects of this disclosure, page loading module 116 may identify, determine, forecast, and/or calculate an amount of time associated with loading each page element of a page, and also identify, determine, forecast, and/or calculate how the amount of time associated with loading each page element of a page affects the expected loading time for a page and/or an amount of time remaining until a page loading event is complete. According to some aspects of this disclosure, page loading module 116 may use an expected loading time for a page and use a linear function to incrementally determine/calculate the amount of time remaining until a page loading event is complete.

According to some aspects of this disclosure, page loading module 116 may generate, render, and/or cause to be displayed an indication (e.g., a pop-up indicator, graphical representation, etc.) of the amount of time remaining until a page loading event is complete. According to some aspects, page loading module 116 may be encoded with and/or use event listeners to detect, determine, and/or identify whenever an interaction with a preview page occurs. For example, a user may use an interactive component of the user device 104 to click and/or select the preview page and event listeners may detect, determine, and/or identify whenever the interactive component of the user device 104 is used to click and/or select the preview page. The event listeners may inform the rendering module 122 whenever the interactive component of the user device 104 is used to click and/or select the preview page and page loading module 116, in response, may generate, render, and/or cause the display an indication (e.g., a pop-up indicator, graphical representation, etc.) of the amount of time remaining until a page loading event is complete.

Figure 2D:
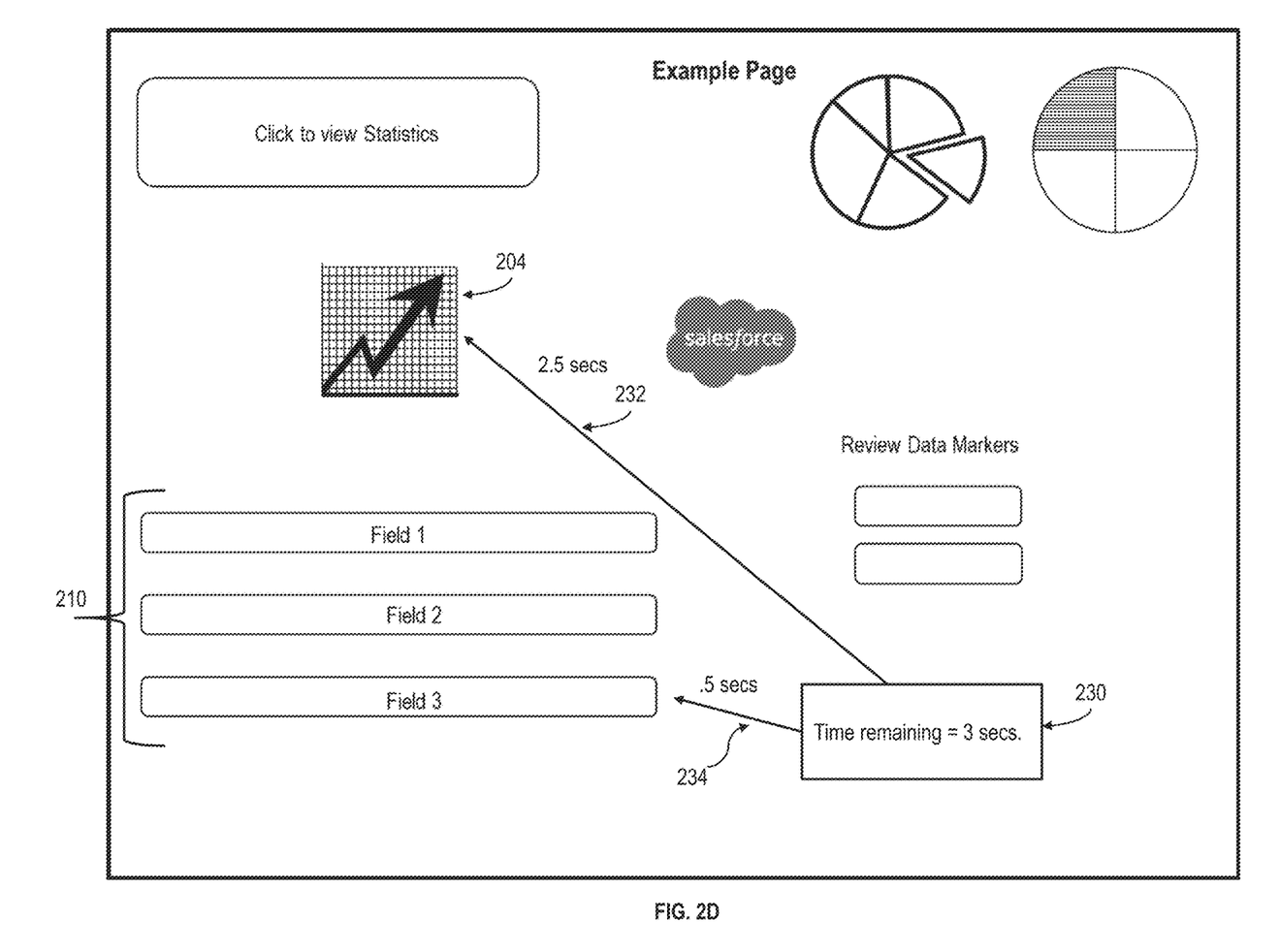

FIG. 2D shows an example of preview page 220. During the animation of page elements 202-218, preview page 220 may display a timing window 230. According to some aspects of this disclosure, timing window 230. Page loading module 116, in response to an interaction with preview page 220, may generate, render, and/or cause the display timing window 230 According to some aspects of this disclosure, timing window 230 may indicate the amount of time remaining until a loading of page 200 (FIG. 2A) is complete.

According to some aspects of this disclosure, page loading module 116 may generate, render, and/or cause the display of indicator elements (e.g., an arrow, a dotted line, etc.), such as indicator elements 232 and 234, that indicate correspondence between timing window 230 and page element of page 200 represented by preview page 220, such as page elements 210 and 204. According to some aspects, indicator elements 232 and 234 indicate an amount of time remaining to load the respective page elements 210 and 204. Indicating an amount of time associated with loading individual age elements enables a user to identify how each page element contributes to the overall duration of a page loading event.

According to some aspects of this disclosure, page loading module 116 may use scalable vector graphics (SVG) and/or the like to generate, render, and/or cause the display of timing window 230 and/or indicator elements 232 and 234. According to some aspects of this disclosure, indicator elements 232 and 234 may overlay preview page 220, and event listeners may be used to detect, determine, and/or identify whenever a location/position of the respective page elements 210 and 204 changes so that indicator elements 232 and 234 may adjust to the changed location/position. For example, event listeners may be used to adjust and/or correct an angle of connection between page elements 210 and 204 and timing window 230 indicated by indicator elements 232 and 234.

Figure 3:
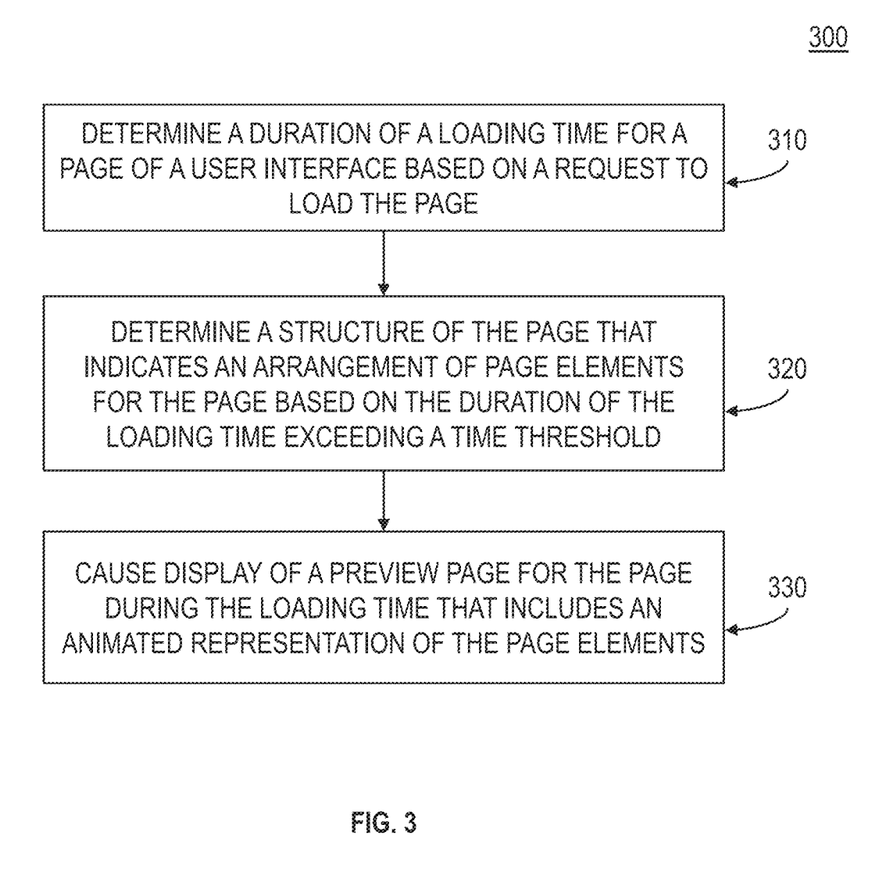
FIG. 3 shows a flowchart of an example method for representing loading of a page of a user interface, according to some aspects.

FIG. 3 shows a flowchart of an example method 300 for representing loading of a page of a user interface, according to some aspects. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1-2C. However, method 300 is not limited to the aspects of those figures.

In 310, user device 104 determines a duration of a loading time (e.g., web page, application page, links and/or linked data, documentation, a screen, etc.) of a user interface. According to some aspects of this disclosure, user device 104 determines the duration of the loading time based on a request to load (e.g., render, access, display, view, etc.) the page of the user interface.

According to some aspects of this disclosure, user device 104 may determine the duration of the loading time for the page based on information received from a predictive model. For example, determining and/or identifying the duration of the loading time for the page may include receiving an indication of the duration of the loading time from a predictive model trained to forecast loading times for user interface pages. For example, information indicative of the page (e.g., a page identifier, a session identifier, a universal resource locator, etc.) may be input to the predictive model and the predictive model may forecast the duration of the loading time for the page.

According to some aspects of this disclosure, determining the duration of the loading time for the page may include user device 104 identifying an expected loading time for the page based on an identifier of the page. For example, user device 104 may store and/or access information (e.g., a lookup table, etc.) mapping the identifier of the page to the expected loading time.

According to some aspects of this disclosure, user device 104 may adjust the expected loading time for the page to be the duration of the loading time for the page. For example, according to some aspects of this disclosure, user device 104 may adjust the expected loading time for the page to be the duration of the loading time for the page based on an amount of network errors detected between at least a portion of a communication path between user device 104 and a source (e.g., content source 106, etc.) of information for the page.

According to some aspects of this disclosure, user device 104 may adjust the expected loading time for the page to be the duration of the loading time for the page based on a detected/determined (e.g., via telemetry data, a network sniffer and/or analysis module/component of user device 104 and/or a device in communication with user device 104, etc.) amount of available network bandwidth and/or latency.

In 320, user device 104 determines a structure of the page that indicates an arrangement of page elements of the page. According to some aspects of this disclosure, the structure of the page that indicates the arrangement of page elements of the page may be indicated by a Document Object Model (DOM) and/or the like. According to some aspects of this disclosure, user device 104 identifies the structure of the page that indicates the arrangement of page elements based on the duration of the loading time exceeding a time threshold. For example, user device 104 may compare the duration of the loading time to the time threshold and identify that duration of the loading time is longer (and/or equal to) an amount of time associated with the time threshold.

According to some aspects of this disclosure, user device 104 determines the structure of the page that indicates the arrangement of page elements based on information stored by and/or accessible to the user device 104. For example, user device 104 may store image data indicative of the structure of the page. According to some aspects of this disclosure, user device 104 may store image data indicative of the structure of the page based on another (e.g., previous, etc.) loading of the page. For example, based on another (e.g., previous, etc.) loading of the page. For example, according to some aspects of this disclosure, user device 104 (and/or a device in communication with user device 104, etc.) may capture a DOM for the page based on a previous/last and/or different visit/navigation to the page, and save it locally as a base64 image (e.g., using canvas element, JavaScript, etc.).

In 330, user device 104 causes a display of a preview page for the page. According to some aspects of this disclosure, user device 104 causes the display of the preview page during the loading time for the page (e.g., while the page is loading, etc.). According to some aspects of this disclosure, the preview page may include an animated representation of the structure of the page. According to some aspects of this disclosure, the animated representation of the structure of the page may be based on Hypertext Markup Language (HTML), Cascading Style Sheets (CS S) encoding, rendering, and/or the like.

According to some aspects of this disclosure, the animated representation of the structure of the page may indicate a plurality of additional arrangements of the page elements. According to some aspects, at least a portion of the page elements of the plurality of additional arrangements may be obscured, blurred, and/or the like. According to some aspects of this disclosure, at least a portion of the page elements of the plurality of additional arrangements may be modified from a representation in the arrangement of page elements of the page to different representations in the at least two additional arrangements of the page elements. For example, the animated representation of the structure of the page may include a blurred puzzle arrangement of the page elements of the page that falls into place during the loading time and/or as the page is being loaded, rendered, prepared for display, and/or the like. According to some aspects of this disclosure, the animated representation of the structure of the page may include blurred representations (e.g., blocks, etc.) of the page elements that become smaller and/or less blurred until the page is ready to be displayed, rendered, viewed, etc. According to some aspects of this disclosure, the animated representation of the structure of the page may include any animated manipulation and/or representation of the page elements.

According to some aspects of this disclosure, method 300 may further include user device 104 causing display of a graphical representation of an amount of time remaining for the duration of the loading time for the page. According to some aspects of this disclosure, user device 104 causes display of the graphical representation of an amount of time remaining for the duration of the loading time for the page based on an interaction with the preview page for the page. According to some aspects, the interaction may be a selection (e.g., selection via a mouse/keyboard entry, touchscreen, etc.) or movement (e.g., hovering a cursor/indicator over, etc.) to a location of the preview page.

According to some aspects, the graphical representation of the amount of time remaining for the duration of the loading time for the page may include an indication of an amount of time associated with loading a first page element of the page elements of the page, an amount of time associated with loading a second page element of the page elements of the page, and/or the like.

Figure 4:
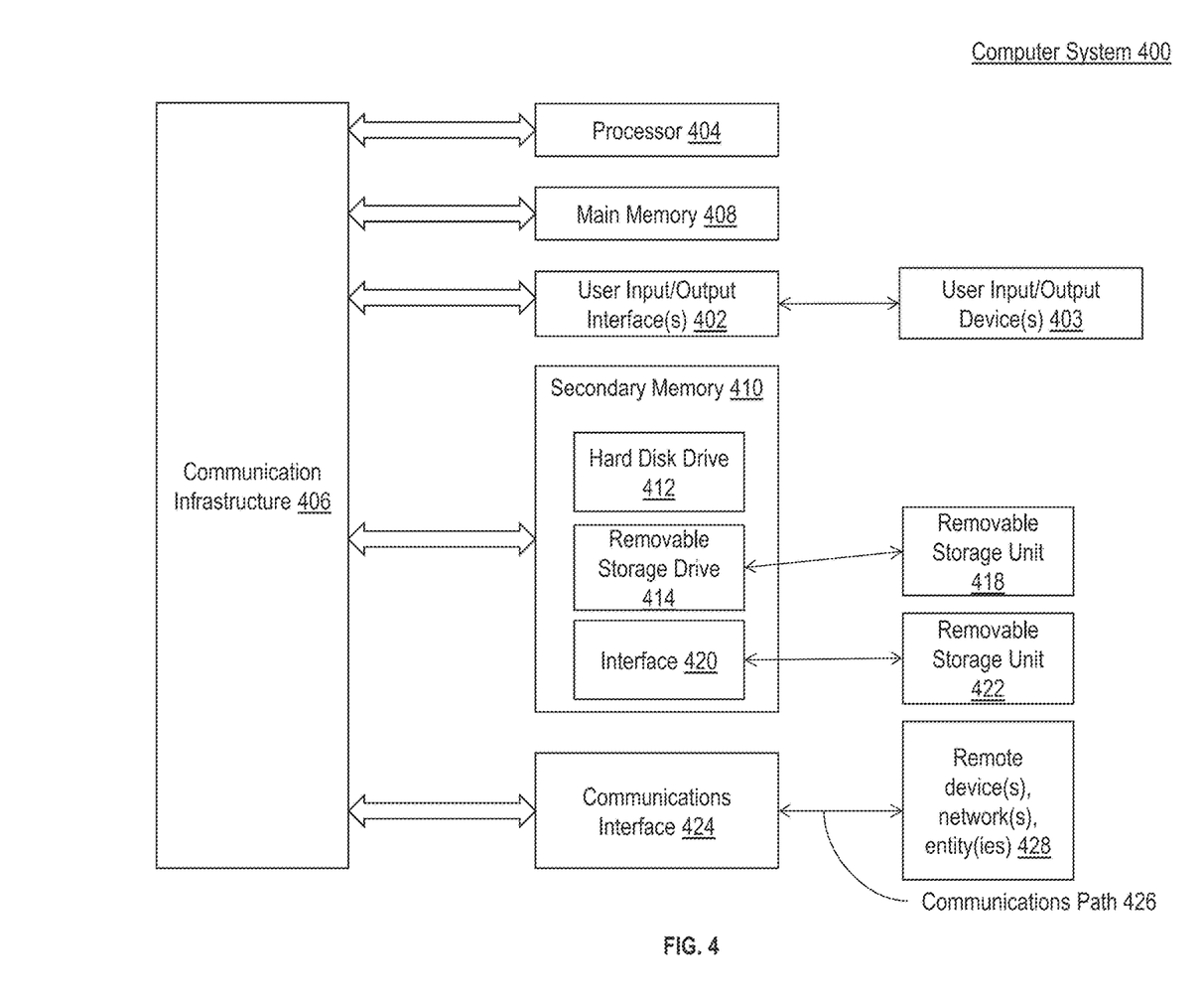
FIG. 4 shows a schematic block diagram of an example computer system in which aspects described may be implemented.

FIG. 4 is an example computer system useful for implementing various embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof. According to some aspects of this disclosure, the user device 104 of FIG. 1 (and/or any other device/component described herein) may be implemented using the computer system 400. According to some aspects of this disclosure, the computer system 400 may be used to implement method 300 and/or any other methods and/or steps described herein.

Computer system 400 may include one or more processors (also called central processing units, or CPUs), such as a processor 404. Processor 404 may be connected to a communication infrastructure or bus 406.

Computer system 400 may also include user input/output device(s) 402, such as monitors, keyboards, pointing devices, etc., which may communicate with communication infrastructure or bus 406 through user input/output device(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, a tape backup device, and/or any other storage device/drive.

Removable storage drive 414 may interact with a removable storage unit 418. The removable storage unit 418 may include a computer-usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to the removable storage unit 418.

Secondary memory 410 may include other means, devices, components, instrumentalities, and/or other approaches for allowing computer programs and/or other instructions and/or data to be accessed by computer system 400. Such means, devices, components, instrumentalities, and/or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "an aspect," "aspects," "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    determining, by one or more computing devices, based on a request to load a page of a user interface, a duration of a loading time for the page;
    determining, by the one or more computing devices, based on the duration of the loading time exceeding a time threshold, a structure of the page that indicates an arrangement of page elements of the page;
    causing, by the one or more computing devices during the loading time, display of a preview page for the page comprising an animated representation of the structure of the page indicating a plurality of additional arrangements of the page elements; and
    causing, by the one or more computing devices and based on an interaction with the preview page for the page, display of a graphical representation of an amount of time remaining for the duration of the loading time for the page.

2. The method of claim 1, wherein the determining the duration of the loading time for the page comprises receiving, from a predictive model trained to forecast loading times for user interface pages, based on information indicative of the page input to the predictive model, an indication of the duration of the loading time.

3. The method of claim 1, wherein the determining the duration of the loading time for the page comprises:
    determining, based on an identifier of the page, an expected loading time for the page; and
    adjusting, based on at least one of an amount of network errors or an amount of available network bandwidth, the expected loading time for the page to be the duration of the loading time for the page.

4. The method of claim 1, wherein at least a portion of the page elements of the plurality of additional arrangements are at least one of obscured or modified from a representation in the arrangement of page elements of the page to different representations in the plurality of additional arrangements of the page elements.

5. The method of claim 1, further comprising generating, based on another loading of the page, image data indicative of the structure of the page, wherein the animated representation of the structure of the page is based on an animation of the image data.

6. The method of claim 1, wherein the graphical representation of the amount of time remaining for the duration of the loading time for the page includes an indication of an amount of time associated with loading a first page element of the page elements of the page and an amount of time associated with loading a second page element of the page elements of the page.

7. A non-transitory computer-readable medium having instructions stored thereon that, when executed by at least one computing device, causes the at least one computing device to perform operations comprising:
    determining, based on a request to load a page of a user interface, a duration of a loading time for the page;
    determining, based on the duration of the loading time exceeding a time threshold, a structure of the page that indicates an arrangement of page elements of the page;
    causing, during the loading time, display of a preview page for the page comprising an animated representation of the structure of the page indicating a plurality of additional arrangements of the page elements; and
    causing, based on an interaction with the preview page for the page, display of a graphical representation of an amount of time remaining for the duration of the loading time for the page.

8. The non-transitory computer-readable medium of claim 7, wherein the determining the duration of the loading time for the page comprises receiving, from a predictive model trained to forecast loading times for user interface pages, based on information indicative of the page input to the predictive model, an indication of the duration of the loading time.

9. The non-transitory computer-readable medium of claim 7, wherein the determining the duration of the loading time for the page comprises:

determining, based on an identifier of the page, an expected loading time for the page; and adjusting, based on at least one of an amount of network errors or an amount of available network bandwidth, the expected loading time for the page to be the duration of the loading time for the page.

10. The non-transitory computer-readable medium of claim 7, wherein at least a portion of the page elements of the plurality of additional arrangements are at least one of obscured or modified from a representation in the arrangement of page elements of the page to different representations in the plurality of additional arrangements of the page elements.

11. The non-transitory computer-readable medium of claim 7, the operations further comprising generating, based on another loading of the page, image data indicative of the structure of the page, wherein the animated representation of the structure of the page is based on an animation of the image data.

12. The non-transitory computer-readable medium of claim 7, wherein the graphical representation of the amount of time remaining for the duration of the loading time for the page includes an indication of an amount of time associated with loading a first page element of the page elements of the page and an amount of time associated with loading a second page element of the page elements of the page.

13. A system comprising:

a memory; and at least one processor coupled to the memory and configured to perform operations comprising:

determining, based on a request to load a page of a user interface, a duration of a loading time for the page;

determining, based on the duration of the loading time exceeding a time threshold, a structure of the page that indicates an arrangement of page elements of the page;

causing, during the loading time, display of a preview page for the page comprising an animated representation of the structure of the page indicating a plurality of additional arrangements of the page elements; and causing, based on an interaction with the preview page for the page, display of a graphical representation of an amount of time remaining for the duration of the loading time for the page.

14. The system of claim 13, wherein the determining the duration of the loading time for the page comprises receiving, from a predictive model trained to forecast loading times for user interface pages, based on information indicative of the page input to the predictive model, an indication of the duration of the loading time.

15. The system of claim 13, wherein the determining the duration of the loading time for the page comprises:

determining, based on an identifier of the page, an expected loading time for the page; and adjusting, based on at least one of an amount of network errors or an amount of available network bandwidth, the expected loading time for the page to be the duration of the loading time for the page.

16. The system of claim 13, wherein at least a portion of the page elements of the plurality of additional arrangements are at least one of obscured or modified from a representation in the arrangement of page elements of the page to different representations in the plurality of additional arrangements of the page elements.

17. The system of claim 13, the operations further comprising generating, based on another loading of the page, image data indicative of the structure of the page, wherein the animated representation of the structure of the page is based on an animation of the image data.

* * * * *

UNITED STATES PATENT AND TRADEMARK OFFICE
CERTIFICATE OF CORRECTION

PATENT NO. : 12,008,207 B1
APPLICATION NO. : 18/104143
DATED : June 11, 2024
INVENTOR(S) : Marcelo Origoni et al.

It is certified that error appears in the above-identified patent and that said Letters Patent is hereby corrected as shown below:

In the Specification

In Column 3, Line 26, delete "(HTTP) HTTP" and insert -- (HTTP) --, therefor.

In Column 4, Line 51, delete "page of a page of a" and insert -- page of a --, therefor.

In Column 4, Lines 61-62, delete "page of a page of a" and insert -- page of a --, therefor.

In Column 5, Line 31, delete "page of a page of a" and insert -- page of a --, therefor.

In Column 6, Line 21, delete "page of a page of a" and insert -- page of a --, therefor.

In Column 7, Lines 15-16, delete "page of a page of a" and insert -- page of a --, therefor.

In Column 10, Line 36, delete "(CS S)" and insert -- (CSS) --, therefor.

In Column 11, Line 63, delete "any" and insert -- or --, therefor.

Signed and Sealed this
Eighth Day of October, 2024

Katherine Kelly Vidal
*Director of the United States Patent and Trademark Office*